Figure 1:
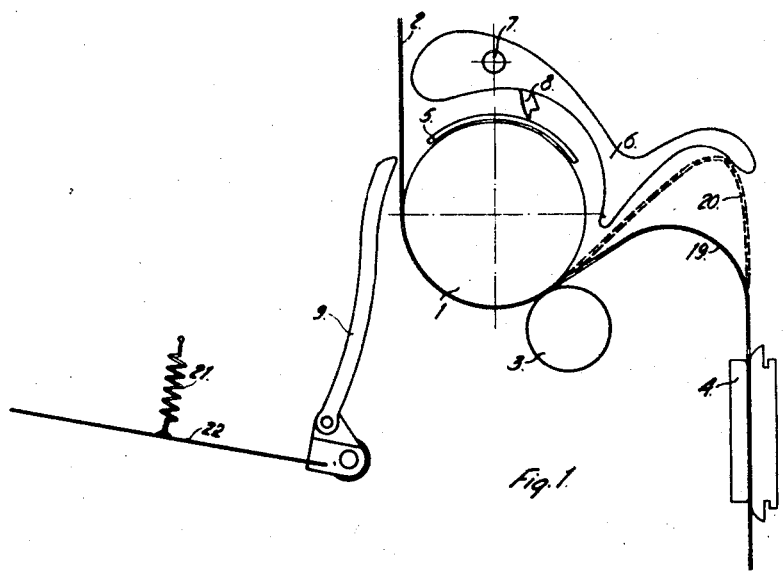

Aug. 26, 1947.  S. P. O. SUNDGREN  2,426,324
FIRE PROTECTIVE DEVICE IN FILM PROJECTOR
Filed Sept. 8, 1944    2 Sheets-Sheet 1

Aug. 26, 1947.  S. P. O. SUNDGREN  2,426,324
FIRE PROTECTIVE DEVICE IN FILM PROJECTOR
Filed Sept. 8, 1944  2 Sheets-Sheet 2
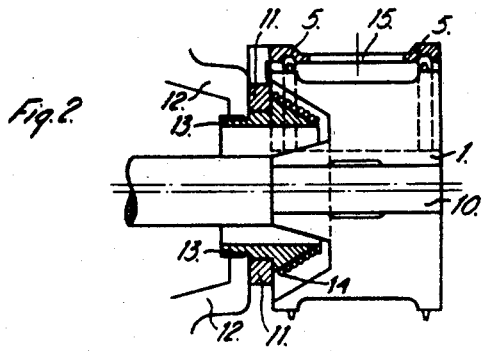
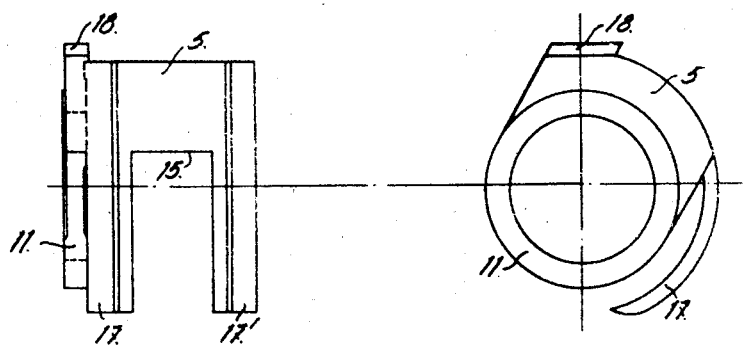

Patented Aug. 26, 1947

2,426,324

UNITED STATES PATENT OFFICE 2,426,324

FIRE PROTECTIVE DEVICE IN FILM PROJECTORS

Stig Per Olof Sundgren, Lidingo, Sweden, assignor to Svenska Aktiebolaget Gasaccumulator, Lidingo, Sweden, a corporation of Sweden Application September 8, 1944, Serial No. 553,144
In Sweden October 28, 1943

5 Claims. (Cl. 88—17)

My invention relates to fire protective device in film projectors.

In modern film projectors for 35 mm. film the radiation of heat from its light source is so great that as a rule the film strip will catch fire instantaneously if the feeding of the film before the gate aperture stops, e. g. on film ruptures. Fire protective devices hitherto known for preventing the film from catching fire and for limiting a possibly started film fire are usually constructed in such a way that a fire shutter automatically masks the gate aperture in case of a rupture in that part of the film strip which at that time is passing through the film gate. The release of the protective device is caused by mechanical action by the film loop that lies between the top sprocket and the gate. This loop increasing rapidly in its size as soon as the feeding through the gates ceases due to a rupture of the film and the increased loop is brought to act against a releasing device of a fire shutter which is set against the force of a spring or the force of gravitation. The release device of the fire shutter is further generally combined with such contact means that the current to the projector motor is interrupted for the purpose of stopping the continued feeding of the film.

A draw-back pertaining to these devices known before is, however, that the feeding of the film strip is not at all stopped at the very moment when the current supply to the motor ceases. Due to the relatively great inertia of the motor and the projector mechanism the fact is that the film continues to be fed during a space of time, which may amount to 4 seconds. By this the film is being folded together and is as a rule destroyed in consequence of the small space, available for the increased film loop. A certain moment of unsafety also lies in the use of electrical contact means, which according to what experience has shown not always have proved sufficiently reliable in such a safety device as it is dealt with here.

The present invention refers to an improved fire protective device in film projectors, which while avoiding electrical contact means is founded on a wholly different principle than such protective devices hitherto known. Instead of bringing the motor shaft or the shaft of the feed sprocket to a stand-still, as it has hitherto been customary, the film itself according to the invention is disengaged from the feed sprocket at practically the same moment as a rupture of the film arises. The feed sprocket may then continue to rotate without increasing the size of the film loop between the feed sprocket and the gate. The arrangement which causes the disengagement of the film is also used to screen or possibly to extinguish the light source of the projector.

The invention will be more closely explained in connection with the accompanying drawings, where Fig. 1 shows a schematic view of the fire protective device, Fig. 2 shows how the film disengaging means is positioned in relation to the top feed sprocket, and Figs. 3-6 show the constructive properties of the film disengaging means in different projections.

In Fig. 1 the top feed sprocket denoted by 1, moves the film 2 in the usual manner over the guide roller 3 to the film gate 4. A film disengaging means 5 is pivotally mounted in the projector casing and arranged to be movable around the feed sprocket. This film disengaging means, which will be more closely described with reference to Figs. 2-6, is normally kept set by a release member 6, which is pivotally supported upon a pin 7 and which with a sharp edge 8 rests against a recess in the disengaging means 5. In the path of movement of a special abutment on the disengaging means 5 there is provided a lever 9 for pulling down the fire shutter 22.

Fig. 2 shows the top feed sprocket 1 with its shaft 10. The film disengaging means 5 consisting of a portion of a cylinder provided with arms is made pivotable round the feed sprocket 1 by means of a supporting ring 11, pivotally mounted upon a bearing member 13, fixed in the projector casing 12. The bearing member 13 is, however, positioned in such a way in relation to the shaft 10 of the feed sprocket 1 that the pivotal movement of the ring 11 and consequently of the film disengaging means 5, too, will become eccentric relative to the rotative movement of the shaft 10 and the feed sprocket 1 respectively. On account of this eccentric bearing it becomes possible, if desired, to remove the feed sprocket 1 from its shaft 10 without the film disengaging means then coming in the way of the feed sprocket. The ring 11 and the film disengaging means 5 is movable against the action of a powerful spiral spring 14, which in the normal position of the film disengaging means is kept set by means of the edge 8, shown in Fig. 1, resting against a recess 15 in the film disengaging means.

From the Figs. 3-6 the construction of the film disengaging means will be seen in detail. Fig. 3 shows a frontal view of the disengaging means in the same position as in Fig. 2. Fig. 4 represents a sideview in section of Fig. 3 along the line I—I. Fig. 5 shows the disengaging means according to Fig. 4 as seen from above and Fig. 6 represents a sideview of Fig. 5. As it will be seen from Fig. 3 the film disengaging means 5 is provided with grooves 16 in order to allow the free passage of the teeth of the feed sprocket. From the central part of disengaging means carried by the ring 11 are protruding two claw-shaped fingers or arms 17, 17' adapted to penetrate between the film strip and the feed sprocket when the disengaging means is pivoted round the feed sprocket. To the disengaging means is also attached an abutment 18, which upon rotation of the disengaging means contacts the lever 9 (Fig. 1) controlling the fire shutter 22 supported by a spring 21.

The operation of the arrangement will be as follows: When a rupture of the film occurs, the film loop 19 between the feed sprocket and the gate will immediately increase and occupy the position 20, pressing against the release member 6, as shown in dotted lines in Fig. 1. This release member being supported upon the pin 7 and carefully balanced in instantaneously affected and consequently the edge 8 is disengaged from the recess 15 in the film disengaging means 5, which under the action of the powerful spring 14 is rapidly pivoted around the feed sprocket. The result of the movement of the disengaging means is twofold. Firstly the two arms 17, 17' of the disengaging means are brought in between the film strip and the feed sprocket so that the film strip is disengaged from the teeth of the feed sprocket and further feeding of the film is stopped. Secondly the movement of the disengaging means causes its abutment 18 (Fig. 4-6) to strike against the lever 9 (Fig. 1), which by the action of the spring 14 is pulled downwards so that the fire shutter 22 against the action of the spring 21 is brought to screen the light source in the projector.

The invention may, of course, be modified in several ways without going beyond the scope of the invention.

What is claimed:

1. In combination with a film projector having a film gate and a feed sprocket for feeding film to form a loop between said sprocket and said gate of a fire protective device including, means operable for disengaging the film from said sprocket to stop the feed substantially instantaneously, and means responsive to an enlargement of the film loop for operating the first-mentioned means.

2. In combination with a film projector having a film gate and a feed sprocket for feeding film to form a loop between said sprocket and said gate of a fire protective device including, a pivotally mounted arcuate member normally disposed around a portion of the periphery of said sprocket other than the portion which engages the film, and means responsive to an enlargement of the film loop for effecting pivotal movement of said member to a position between said sprocket and the film to disengage the film from the sprocket.

3. In combination with a film projector having a film gate and a feed sprocket having projecting teeth for engaging the perforations in a film for feeding the film to form a loop between said sprocket and said gate of a fire protective device including, an arcuate member pivotally mounted eccentrically with respect to the axis of said sprocket and normally disposed around a portion of the periphery of said sprocket other than the portion engaged by the film, the inner surface of said member being grooved peripherally to receive the outer ends of said teeth, and means responsive to an enlargement of the film loop for effecting pivotal movement of said member to a position between said sprocket and the film to disengage the film from the sprocket.

4. In combination with a film projector having a film gate and a feed sprocket for feeding film to form a loop between said sprocket and said gate of a fire protective device including, a pivotally mounted arcuate member normally disposed around a portion of the periphery of said sprocket other than the portion which engages the film, a movable fire shutter, means responsive to an enlargement of the film loop for effecting pivotal movement of said member to a position between said sprocket and the film to disengage the film from the sprocket, and means for moving said shutter in response to the aforesaid pivotal movement of said member.

5. In combination with a film projector having a film gate and a feed sprocket for feeding film to form a loop between said sprocket and said gate of a fire protective device including, a pivotally mounted arcuate member normally disposed around a portion of the periphery of said sprocket other than the portion which engages the film, spring means tending to pivot said member to a position between said sprocket and the film to disengage the film from the sprocket, a lever having means for latching said member in the first-mentioned position against the force of said spring means, a portion of said lever being located adjacent to said loop so as to be contacted by the film upon an enlargement of the loop and moved to unlatch said member.

STIG PER OLOF SUNDGREN.

REFERENCES CITED

The following references are of record in the file of this patent:

UNITED STATES PATENTS

| Number | Name | Date |
| --- | --- | --- |
| 1,993,735 | Foster | Mar. 12, 1935 |
| 1,352,218 | Power | Sept. 7, 1920 |
| 1,509,256 | Power | Sept. 23, 1924 |
| 1,821,515 | Hoffman et al. | Sept. 1, 1931 |
| 1,925,657 | Frappier et al. | Sept 5, 1933 |
| 2,187,988 | Sherwood et al. | Jan. 23, 1940 |
| 2,051,788 | Foster et al. | Aug. 18, 1936 |
| 2,051,789 | Foster et al. | Aug. 18, 1936 |